Sept. 25, 1934.     V. G. APPLE     1,974,406

DYNAMO ELECTRIC MACHINE CORE SLOT LINING

Filed Dec. 13, 1930

INVENTOR

Patented Sept. 25, 1934

1,974,406

UNITED STATES PATENT OFFICE

1,974,406

DYNAMO ELECTRIC MACHINE CORE SLOT LINING

Vincent G. Apple, Dayton, Ohio; Herbert F. Apple, Edward M. Apple, and Gourley Darroch executors of said Vincent G. Apple, deceased Application December 13, 1930, Serial No. 502,147

3 Claims. (Cl. 171—206)

This invention relates to insulation linings, for the winding slots of the cores of dynamo electric machines, and particularly to those in which the coils each comprise a plurality of turns of insulated wire.

An object of the invention is to provide linings which are more effective and more durable.

Another object is to provide means to more permanently secure the linings in the slots.

Still another object is to so arrange the core slot linings as to make them effective for holding the core laminae together.

Still another object is to so form the slot linings as to obviate the necessity of having the two outside laminae of the core of sheet insulation.

Other objects and meritorious features are attained in the product, by the process and with the tools disclosed in the following specification and shown in the accompanying drawing, wherein—

Similar numerals refer to similar parts throughout the several views.

Figure 1:
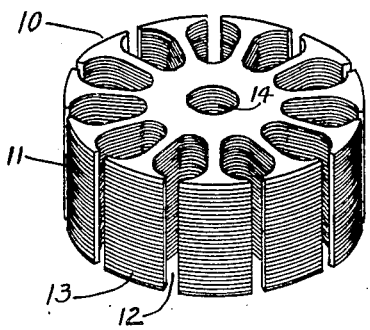
Fig. 1 is a laminated core for a dynamo electric machine armature.

The core 10 is composed of a plurality of iron laminae 11 having winding slots 12 separated by teeth 13. There is a central opening 14 for an armature shaft. The laminae 11 are temporarily held together in any suitable manner, the central opening 14 being temporarily used for a bolt if so desired.

Figure 2:
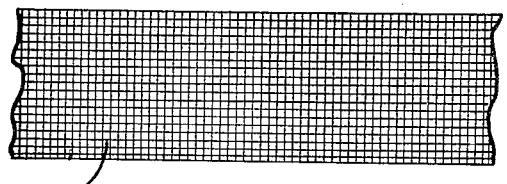
Fig. 2 is a strip of insulation-treated fabric which I use to line the core slots.

To line the winding slots 12 I provide the strip of cotton or equivalent fabric 16, Fig. 2, which is preferably of coarse weave and relatively thick and which has its mesh completely filled with an insulating material preferably of a cementitious nature and in a pliable state but which may be afterward hardened when it is in place on the core and properly formed.

Figure 3:
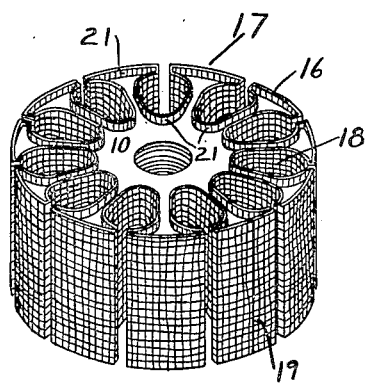
Fig. 3 shows the strip of fabric in the core slots with the edges of the strip extending beyond the ends of the core.

Fig. 3 shows an assembly 17 comprising the core 10 with the strip of insulation saturated fabric 16 in place. The strip 16 is continuous and of such length as to reach completely around the core, looping downward in each slot 12 to form a lining 18 therefor, the ends of the strip being brought together at 19. The strip is of such width that the edges extend beyond the ends of the core as at 21.

Figure 4:
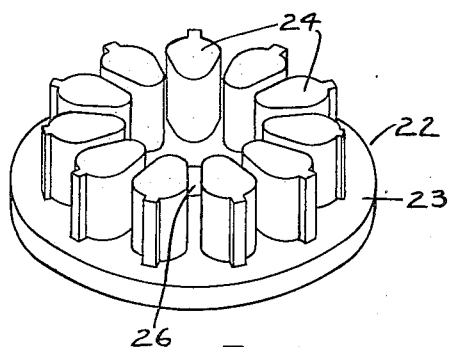
Fig. 4 shows one of the forming tools which I employ for forming the linings in the core slots.

After the assembly 17, Fig. 3, has been completed the next step is to press the linings 18 snugly against the inside of the core slots 12 and to form the extending ends 19 by pressing them away from the edges of the slots 12 and over the ends of the teeth 13. To facilitate this operation two forming tools 22, Fig. 4, are provided.

Each forming tool 22 comprises a plate 23 with pilots 24 corresponding in number, position and contour to the slots 12 of core 10, but which are only half as long as the slots and sufficiently smaller to allow for the lining 18 between each pilot 24 and its corresponding slot 12. There is a central opening 26 through each plate 23.

Figure 5:
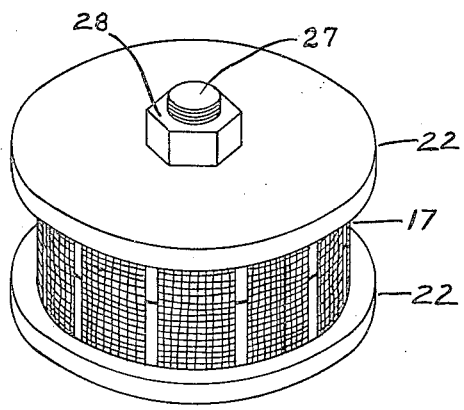
Fig. 5 shows a lined core with the forming tools around it.

Fig. 5 shows the assembly 17 with two forming tools 22 in place all held together by the bolt 27 and the nut 28. When the nut 28 is drawn up the tools 22 form the extending ends 21 away from the slots and over the ends of the teeth. In this state the core assembly with its insulation saturated linings is baked or otherwise treated to harden the insulation and permanently cement it to the core.

Figure 6:
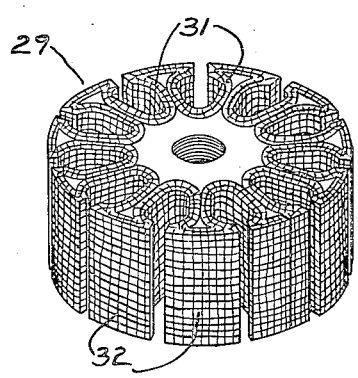
Fig. 6 shows a core with the slot linings completed.

Fig. 6 shows an assembly 29 with the slot linings completed and the core ready to wind. It will be seen that the extending ends 21 have been flattened down against the end of the core as at 31, making the slot linings in effect a series of fabric reinforced hollow rivets of insulation which are not easily shifted in the slots and which hold the stack of core laminae bound together.

When a completed assembly 29 is wound with insulated wire, the insulation of the wire is better protected where it passes around the corners of the teeth at the ends of the core than it is where fibre end laminae are employed as in common practice, since the slot insulation in the present invention extends over the corners of the teeth in a continuous piece. The parts 32 of the fabric which overlie the outer surfaces of the core teeth are preferably not removed until the armature is otherwise complete, and they may then be removed by grinding, turning or similar means. It is however to be understood that the parts 32 have no function in the invention except to facilitate putting the linings into the slots and they may be cut away before the core is wound, or, if desired, the slot linings may be composed of a plurality of separate strips, one for each slot, and come within the spirit of the invention, to more completely define which—

I claim,

1. The method of insulating the winding slots of the core of a dynamo electric machine element, which consists of filling the pores of a strip of loosely woven fabric with pliable insulation which becomes cementitious by heat lining said slots with said fabric, said fabric extending slightly beyond the ends of the core, pressing the insulation filled fabric closely against the inner surfaces of the core slots and flattening the extending ends against the ends of the core, heating to insulation until it softens and cements the fabric to the inside of the slots and to the ends of the core, then hardening the insulation while the fabric is so held.

2. A laminated dynamo electric machine core having the laminæ held together solely by a plurality of slot linings of compressed and hardened insulation-saturated fabric extending through the core slots and cemented thereto.

3. A laminated dynamo electric machine core having the laminæ held together solely with hollow rivets of compressed and hardened insulation-saturated fabric, each hollow rivet having an integral rivet head at each end seated tightly against the ends of the core, said hollow rivets serving also as insulation linings for the core slots.

VINCENT G. APPLE.